Sept. 12, 1950          D. J. ORIOLO          2,521,940
REMOVAL OF CATALYST FROM OLEFIN POLYMER PRODUCT
Filed May 22, 1948
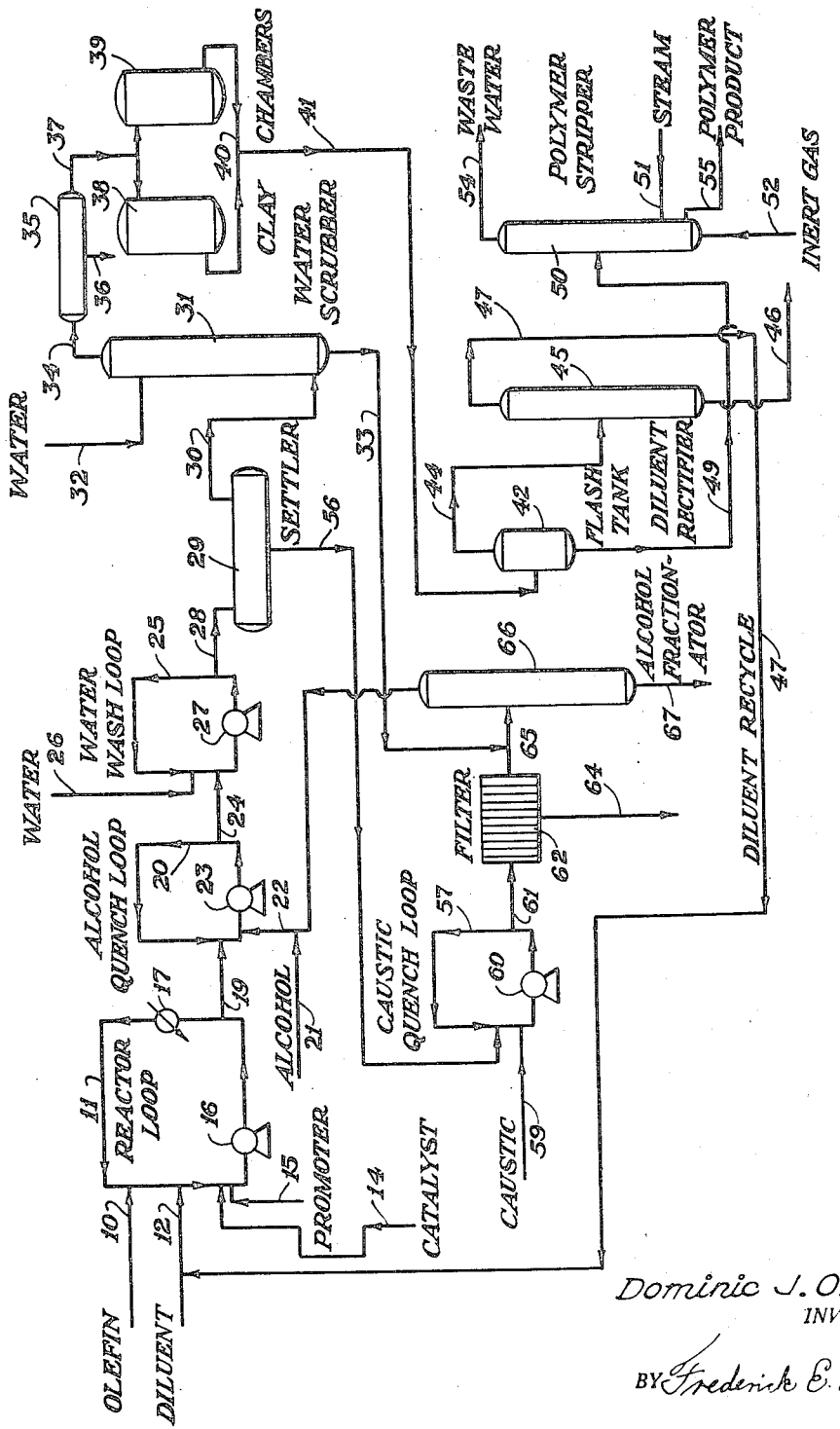
Dominic J. Oriolo
INVENTOR.
BY Frederick E. Dumoulin
AGENT Patented Sept. 12, 1950

2,521,940

UNITED STATES PATENT OFFICE 2,521,940

REMOVAL OF CATALYST FROM OLEFIN POLYMER PRODUCT

Dominic J. Oriolo, Woodbury, N. J., assignor to Socony-Vacuum Oil Company, Incorporated, a corporation of New York Application May 22, 1948, Serial No. 28,616

15 Claims. (Cl. 260—683.15)

This invention relates to the polymerization of olefins and relates more particularly to a method for removing the polymerization catalyst and catalyst promoter from the polymerization reaction effluent and polymer product.

It is well known that olefins, such as propylene, butenes, pentenes, etc., may be polymerized in the presence of metal halide catalysts, such as aluminum bromide, etc., to produce polymer products which have characteristics making them suitable as lubricating oils or as blending agents for lubricating oils. In such polymerization reactions, it is customary to employ, as a catalyst promoting agent, a hydrogen halide such as hydrogen bromide. The polymerization reaction effluent contains the catalyst and promoting agent incorporated or dissolved therein and it is highly desirable that the catalyst and promoting agent be removed in order to prevent subsequent depolymerization effects and thereby obtain a polymer product of the highest viscosity and purity.

It is an object of this invention to provide a process for the removal of catalyst and promoting agent from olefin polymer products. It is another object to provide a process whereby the viscosity of olefin polymer products may be increased. It is another object of the invention to provide a process whereby an agent employed for removing catalyst and promoting agent from olefin polymerization products may be recovered for reuse. Other objects of the invention will become apparent from the following description thereof.

In accordance with the invention, effluent from an olefin polymerization reaction zone wherein the polymerization reaction has been catalyzed with metal halide catalyst and promoted with a hydrogen halide catalyst promoter is admixed with alcohol to react with the metal halide catalyst thereby forming an alcohol-metal halide complex which is insoluble in the effluent. The effluent is then contacted with water to dissolve the hydrogen halide promoter and reconvert the complex to the alcohol. The alcohol and water phase containing dissolved hydrogen halide and the dissolved reaction product of the catalyst and the water is allowed to settle from the effluent and is admixed with caustic to react with the dissolved hydrogen halide and convert it to a metal halide. The alcohol and water phase is then fractionated to produce an alcohol-water azeotropic mixture which is recycled for admixture with further effluent from the polymerization reaction zone. The effluent from which the alcohol and water phase has been settled is washed with water to remove alcohol therefrom and the washings are also fractionated to recover and recycle the alcohol-water azeotrope. Water is allowed to coalesce from the effluent and the effluent is thereafter treated to recover the desired polymer product therefrom.

For admixing with the polymerization reaction zone effluent, any suitable type of alcohol may be employed. Examples of suitable alcohols are ethyl, propyl, isopropyl, butyl alcohols, etc. Preferably, however, isopropyl alcohol is employed in view of its availability and economy. Of the other alcohols, propyl alcohols or butyl alcohols are to be preferred. The amount of alcohol to be employed should be in excess of the amount theoretically required in order to insure complete reaction, i. e., to form a complex with the catalyst. In the case of aluminum bromide, two mols of alcohol react with each mol of aluminum bromide to form the complex. A 50% excess of alcohol is preferred and accordingly, at least three mols of alcohol per mol of aluminum bromide is preferred. Higher ratios of alcohol to catalyst may be employed, if desired, since the alcohol may be recovered and reused. Where other types of alcohols are employed for reaction with other metal halide catalysts, similar ratios of alcohol to catalyst may be used.

The amount of water employed for contact with the mixture of reactor effluent and alcohol should be sufficient to hydrolyze the alcohol-metal halide complex. Here, too, in order to insure complete hydrolysis and to insure solution of the hydrogen halide promoting agent, an amount greater than the amount theoretically required is preferably employed. Two to three mols of water for each mol of alcohol-metal halide complex and hydrogen halide promoting agent will be satisfactory.

Any suitable type of caustic may be employed. Sodium hydroxide is preferred in view of its economy and availability, although potassium hydroxide, calcium hydroxide and other types of caustic are satisfactory. Preferably, the caustic is employed in the form of a solution or a slurry and sufficient amounts should be added to the alcohol-water mixture to react with the entire amount of hydrogen halide contained therein.

The process of the invention may be applied in connection with the polymerization of any type of olefin. Examples of such olefins are propylene, the butenes, pentenes, etc. The process of the invention may also be applied in connection with the interpolymerization of olefins, such as the interpolymerization of propylene with a butene, or the copolymerization of a mono-olefin and a diolefin. Generally, the process of the invention is applicable to any polymerization operation where the polymer product contains metal halide catalyst and hydrogen halide promoter. Examples of catalysts and promoters ordinarily employed in such polymerizations and which may be removed in accordance with the invention are, respectively, the metal halides, such as ferric bromide, boron fluoride and the aluminum halides such as aluminum bromide and aluminum chloride, and the hydrogen halides, such as hydrogen bromide, hydrogen chloride, and hydrogen fluoride.

By the process of the invention, improved polymer products are obtained. These improved products are the result of the combination of the steps of admixture of the reactor effluent with alcohol, admixture thereafter with water, removal of the alcohol and water from the effluent, and subsequent scrubbing of the effluent with further quantities of water. This will be illustrated by the following examples.

Example I

In this example, propylene was polymerized by admixing with normal butane diluent and contacting in a continuous polymerization reactor with a solution of aluminum bromide in normal butane containing hydrogen bromide promoter. The reactor effluent was admixed with isopropyl alcohol of 95% purity in the amount of three mols of alcohol per mol of aluminum bromide contained in the effluent. The mixture of reactor effluent and alcohol was then admixed with water in the amount of three mols of water per mol of alcohol-aluminum bromide complex. The water and alcohol solution was allowed to settle and was removed from the mixture. The hydrocarbon effluent was then flash evaporated for removal of the normal butane diluent. The resulting polymer was steam distilled to remove light polymer products and the heavy polymer recovered as a final product. The heavy polymer was black in color and had a 210° F. viscosity of 1263 Saybolt Universal seconds.

Example II

In this example, the same procedures as above were followed with the exception that, following settling of the water-alcohol solution, the reactor effluent was scrubbed countercurrently with water in a packed tower. The final product, after removal of light polymer products had a N. P. A. color of 2 and a 210° F. viscosity of 2112 Saybolt Universal seconds.

The drawing is a flowsheet schematically illustrating one embodiment of the invention.

Referring now to the drawing, olefin, which may be propylene, is fed from line 10 to reactor 11, which, as shown, is of the loop type. A diluent, which may be normal butane or any inert hydrocarbon solvent, is fed to the reactor through line 12 while polymerization catalyst, which may be aluminum bromide dissolved in an inert hydrocarbon solvent, suitably normal butane, is fed through line 14. A promoting agent, suitably hydrogen bromide, enters the reactor through line 15. The combined olefin, diluent, dissolved catalyst, and promoting agent are circulated around the reactor loop 11 by means of pump 16, a suitably low temperature of the reaction mixture being maintained by means of cooler 17. A portion of the reaction mixture is continuously withdrawn as effluent from reactor 11 through line 19 and passed to alcohol quench loop 20 where it is admixed with alcohol entering through lines 21 and 22, intimate contact of the alcohol and effluent being obtained by circulating the mixture around the loop by means of pump 23. A portion of the mixture in loop 20 is continuously withdrawn through line 24 and passed to water wash loop 25 where it is admixed with water entering through line 26. Circulation in loop 25 is effected by means of pump 27. A portion of the mixture in loop 25 is continuously passed through line 28 to settler 29 where the water and alcohol are permitted to settle from the hydrocarbons.

The hydrocarbons are passed from the top of the settler through line 30 to water scrubber 31, where they pass upwardly through the scrubber and are countercurrently contacted with a downwardly flowing stream of water entering the scrubber through line 32. Scrubber 31 may be any suitable type of liquid-liquid contact apparatus such as a packed tower or a bubble plate tower. The water containing the alcohol washed from the hydrocarbons passes from the scrubber through line 33.

The hydrocarbons leave the top of the scrubber through line 34 to water coalescer 35 where any water contained in the hydrocarbons separates out and is removed from the coalescer through line 36. The hydrocarbons then pass through line 37 to either of clay chambers 38 and 39, packed with a suitable type of clay such as bentonite, to insure the removal of any hydrogen bromide, water, or other impurities not removed by the scrubbing with water or not separated in the coalescer. The clay chambers are connected in parallel so that one chamber may be recharged or regenerated while the other is kept on stream. The hydrocarbons leave the chambers through line 40 and pass through line 41 to flash tank 42 where the diluent is permitted to flash off from the heavier polymer product. The flashed diluent passes through line 44 to rectifier 45 where the diluent is separated from light polymer products carried over with the flashed diluent. The light polymer products are discarded through line 46 and the diluent is recycled through line 47 to reactor loop 11 for reuse in the polymerization reaction. The heavier polymer product is withdrawn from the bottom of flash tank 42 through line 49 and passed to stripper 50. The polymer is stripped in stripper 50 by means of steam entering through line 51 for the purpose of removing light polymer products from the desired heavier polymer products. Dissolved water in the desired polymer product from the steam distillation is removed by passing an inert dry gas such as nitrogen through the scrubber from line 52. Waste water, steam, inert gas, and light polymer product are removed through line 54, and the desired polymer product is recovered through line 55.

The mixture of water and alcohol, containing dissolved promoting agent and the reaction products of the water and metallic halide catalyst, leaves the bottom of settler 29 through line 56 and enters caustic quench loop 57 wherein it is intimately admixed with caustic, such as sodium hydroxide, entering through line 59. Pump 60 provides circulation in loop 57. A portion of the mixture in loop 57 is continuously passed through line 61 to filter 62 where solids such as the reaction products of the catalyst and water are filtered out and discarded through line 64.

The filtered liquid then passes through line 65 to fractionator 66. The liquid from the bottom of scrubber 31 containing alcohol is added from line 33 to the liquid from the filter entering fractionator 66. Fractionation of the liquid produces an azeotropic mixture of liquid in water, which in the case of isopropyl alcohol, will contain about 86% by weight of alcohol. This azeotrope is removed through line 22 and recycled to alcohol quench loop 20. Water is removed as waste through line 67.

Having thus described my invention, it will be understood that such description has been given by way of illustration and example only and not by way of limitation, reference for the latter purpose being had to the appended claims.

I claim:

1. In an olefin polymerization process wherein the polymerization reaction is catalyzed with a metal halide catalyst promoted with a hydrogen halide promoting agent, the improvement in removing the catalyst and the promoting agent from the polymer product which comprises admixing an alcohol with the polymer product, thereafter admixing water with the polymer product, removing alcohol and water from the polymer product, and thereafter washing the polymer product with additional water.

2. In an olefin polymerization process wherein the polymerization reaction is catalyzed with a metal halide catalyst promoted with a hydrogen halide promoting agent, the improvement in removing the catalyst and the promoting agent from the polymer product which comprises admixing an alcohol with the polymer product, thereafter admixing water with the alcohol-polymer product mixture, removing water and alcohol from the polymer product, and scrubbing the polymer product with additional water to remove any remaining alcohol therefrom.

3. In an olefin polymerization process wherein the polymerization reaction is catalyzed with an aluminum halide catalyst promoted with a hydrogen halide promoting agent, the improvement in removing the catalyst and the promoting agent from the polymer product which comprises admixing an alcohol with the polymer product, thereafter admixing water with the alcohol-polymer product mixture, removing water and alcohol from the polymer product, and scrubbing the polymer product with additional water to remove any remaining alcohol therefrom.

4. The process of claim 3 wherein the alcohol is isopropyl alcohol.

5. The process of claim 3 wherein the alcohol is propyl alcohol.

6. The process of claim 3 wherein the alcohol is butyl alcohol.

7. The process of claim 3 wherein the catalyst is aluminum bromide, the catalyst promoting agent is hydrogen bromide, and the alcohol is isopropyl alcohol.

8. In an olefin polymerization process wherein the polymerization reaction is catalyzed with a metal halide catalyst and promoted with a hydrogen halide promoter, the improvement comprising admixing polymerization reactor effluent with an alcohol, thereafter admixing water with the alcohol-effluent mixture, removing alcohol and water from the effluent, washing the effluent with additional water to remove any remaining alcohol therefrom, admixing caustic with the mixture of alcohol and water, fractionating the resulting mixture to obtain an azeotropic mixture of alcohol and water therefrom, and recycling the azeotropic mixture for admixture with further polymerization reactor effluent.

9. In an olefin polymerization process wherein the polymerization reaction is catalyzed with an aluminum halide catalyst and promoted with a hydrogen halide promoter, the improvement comprising admixing polymerization reactor effluent with an alcohol, thereafter admixing water with the alcohol-effluent mixture, removing alcohol and water from the effluent, washing the effluent with additional water to remove any remaining alcohol therefrom, admixing caustic with the mixture of alcohol and water, fractionating the resulting mixture to obtain an azeotropic mixture of alcohol and water therefrom, and recycling the azeotropic mixture for admixture with further polymerization reactor effluent.

10. The process of claim 9 wherein the alcohol is isopropyl alcohol.

11. The process of claim 9 wherein the alcohol is propyl alcohol.

12. The process of claim 9 wherein the alcohol is butyl alcohol.

13. The process of claim 9 wherein the catalyst is aluminum bromide, the catalyst promoting agent is hydrogen bromide and the alcohol is isopropyl alcohol.

14. The process of claim 9 wherein the catalyst is aluminum bromide, the catalyst promoting agent is hydrogen bromide, the alcohol is isopropyl alcohol, and the caustic is sodium hydroxide.

15. In an olefin polymerization process wherein the polymerization reaction is catalyzed with a metal halide catalyst and promoted with a hydrogen halide promoter, the improvement comprising admixing polymerization reactor effluent with an alcohol, thereafter admixing water with the alcohol-effluent mixture, removing alcohol and water from the effluent, washing the effluent with additional water to remove any remaining alcohol therefrom, admixing caustic with the mixture of alcohol and water, filtering the resulting mixture to remove solids therefrom, fractionating the filtered mixture to obtain an azeotropic mixture of alcohol and water therefrom, and recycling the azeotropic mixture for admixture with further polymerization reactor effluent.

DOMINIC J. ORIOLO.

REFERENCES CITED

The following references are of record in the file of this patent:

UNITED STATES PATENTS

| Number | Name | Date |
| --- | --- | --- |
| 2,318,719 | Schneider et al. | May 11, 1943 |
| 2,368,596 | Johnston et al. | Jan. 30, 1945 |
| 2,447,313 | Carmody et al. | Aug. 17, 1948 |